Figure 1:
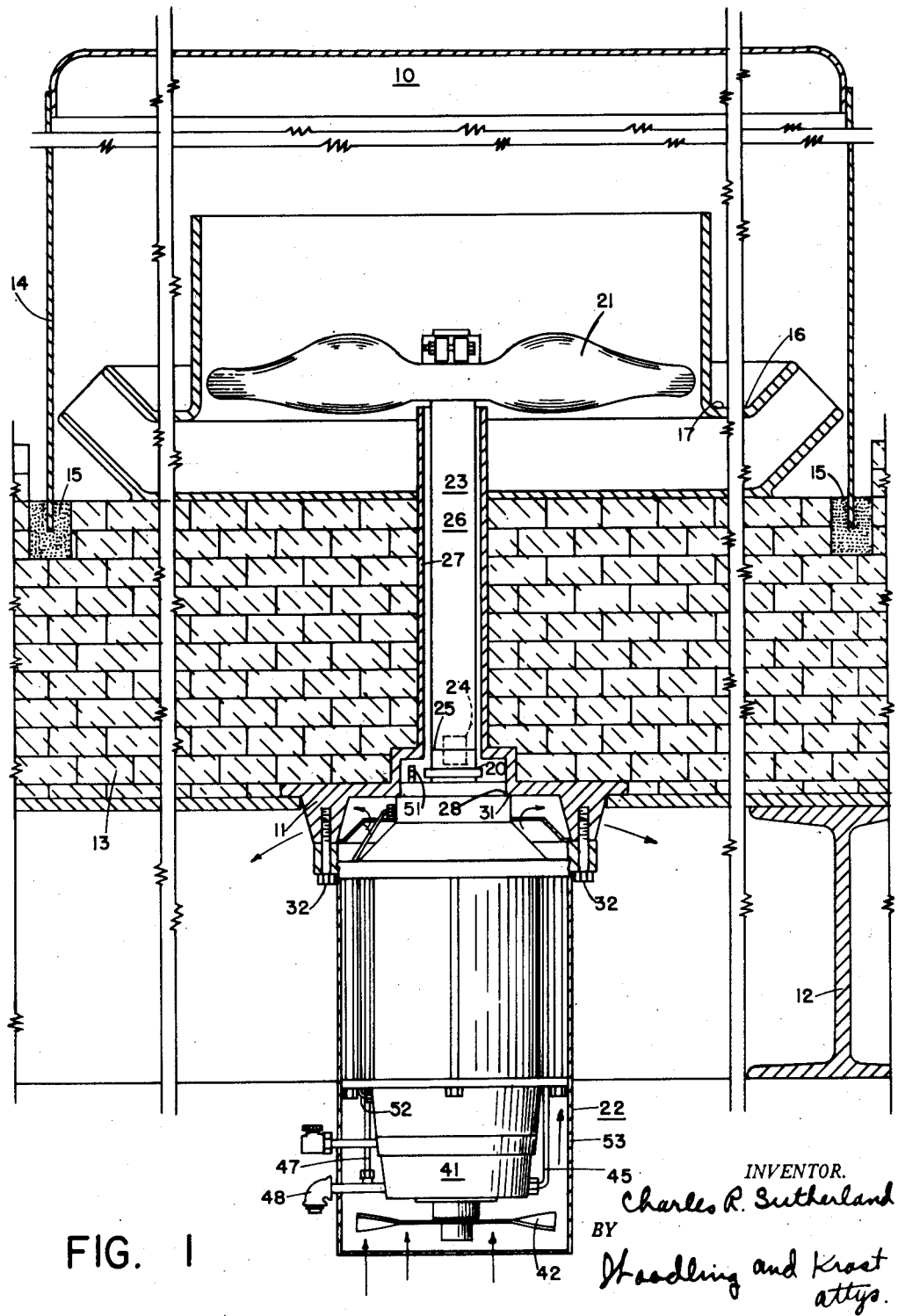

Oct. 27, 1953 C. R. SUTHERLAND 2,656,973
ELECTRIC MOTOR FOR DRIVING A DEVICE WITHIN A COMPARTMENT
Filed June 9, 1949 2 Sheets-Sheet 1

INVENTOR.
Charles R. Sutherland
BY
Hoodling and Krost
attys.

Oct. 27, 1953 C. R. SUTHERLAND 2,656,973
ELECTRIC MOTOR FOR DRIVING A DEVICE WITHIN A COMPARTMENT
Filed June 9, 1949 2 Sheets-Sheet 2

INVENTOR.
Charles R. Sutherland
BY
Stoodling and Krost
attys.

Patented Oct. 27, 1953

2,656,973

UNITED STATES PATENT OFFICE 2,656,973

ELECTRIC MOTOR FOR DRIVING A DEVICE WITHIN A COMPARTMENT

Charles R. Sutherland, Cleveland, Ohio, assignor to The Reliance Electric & Engineering Company, a corporation of Ohio Application June 9, 1949, Serial No. 98,017

7 Claims. (Cl. 230—209)

The invention relates in general to an electric motor for driving a device within a compartment, and more particularly to an electric motor for driving a fan in a heated compartment, together with means for cooling the motor bearing and for housing the motor to blank communication between atmosphere and the heated compartment.

There are a large number of applications requiring a motor driven fan to circulate gases or atmosphere inside of ovens or furnaces. For simplicity, it is desirable to have the fan or blower mounted directly on the extension shaft of the electric motor. Because of the high operating temperatures in the ovens or furnaces, which may be in the neighborhood of 1400 degrees Fahrenheit or higher, it is necessary to mount the motor outside of the ovens or furnaces and extend the shaft of the electric motor into the ovens or furnaces. With this method of mounting, the electric motor is insulated from the high oven or furnace temperature by a partition of insulating brick or other suitable means. However, there still remains the problem of disposing of the heat conducted along the motor shaft without making the extension shaft beyond the bearing means too long. If an attempt is made to minimize the heat conducted along the shaft to the bearing means, by making the extension shaft extra long, then the problem arises of increasing the cross-sectional area of the extension shaft to withstand the strain of the load, in which case an increase in the cross-sectional area of the shaft means that more heat is conducted along the extension shaft to the bearing means, defeating the very purpose to be accomplished.

Therefore, an object of the invention is to provide for restricting the heat conduction along the extension shaft from the hot end positioned in the oven or furnace to the bearing which supports the extension shaft.

Another object of the invention is to provide for circulating a lubricant through the bearing and for cooling the lubricant.

Another object of the invention is the provision of a high heat resistance material for the shaft which has a reduced cross-sectional area to reduce heat flow from the hot end of the extension shaft positioned in the oven or furnace to the bearing of the motor.

Another problem which arises in mounting the motor to the oven or furnace is the fact that the oven or furnace must be preferably maintained airtight to keep atmosphere from entering the oven or furnace through the motor and along the motor shaft extension.

Therefore, it is a further object of the invention to provide a motor housing which blanks communication between atmosphere and the oven or furnace for maintaining the oven or furnace free from atmosphere.

Another object of the invention is to mount the housing of the motor in communication with the furnace or oven and at the same time provide a motor housing which is sealed to blank communication between atmosphere and the heated oven or furnace.

Another object of the invention is to provide air by-pass means providing air communication around the bearing through which normal air communication is made between the inside of the motor housing and the furnace, in which the air by-pass means has less communication resistance than that of the bearing to thereby minimize air communication through the bearing and free the lubricant passing through the bearing from being disturbed by the air communication which normally passes through the bearing.

Figure 2:
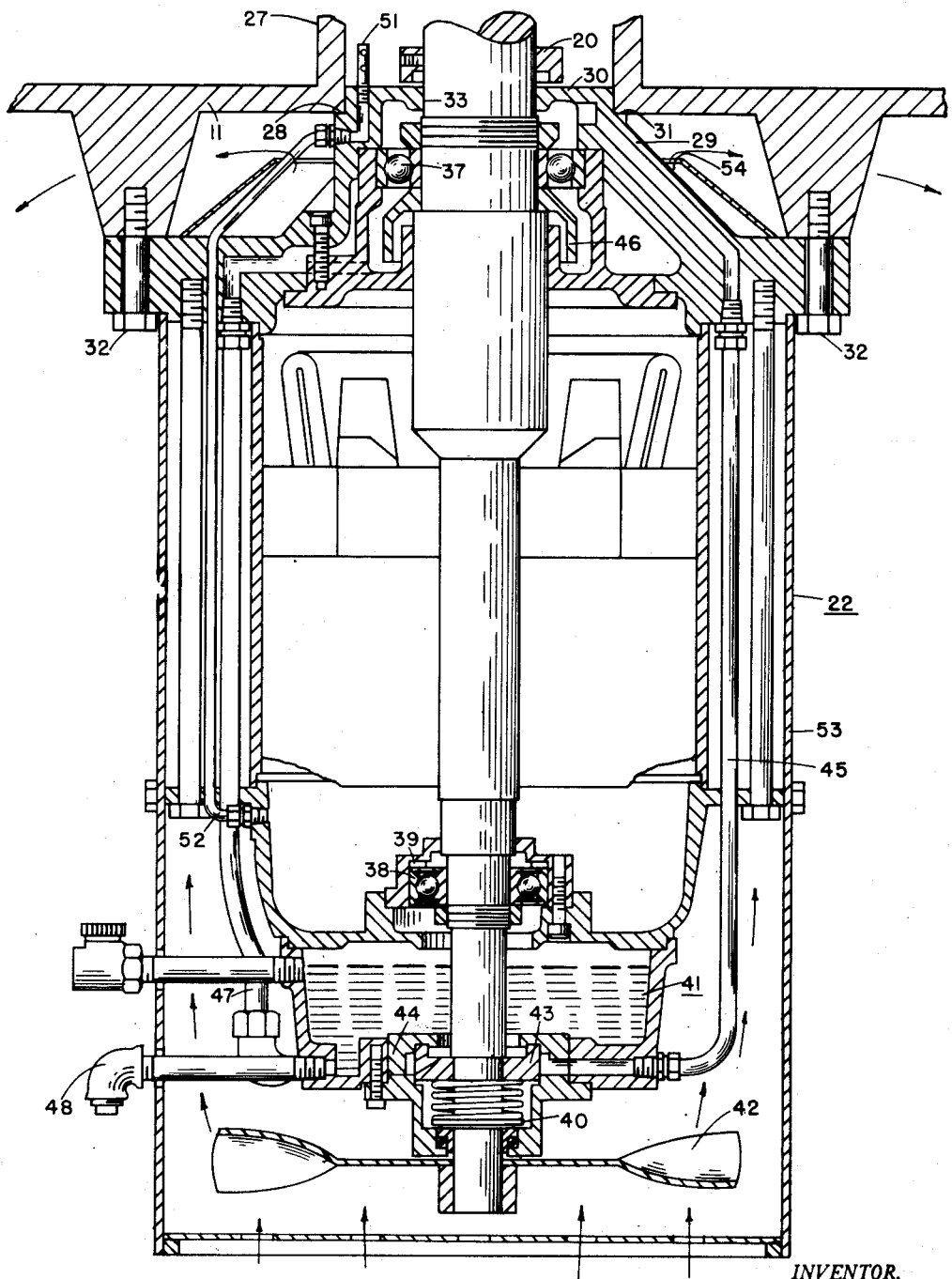

Other objects and a fuller understanding of the invention may be had by referring to the following description and claims, taken in conjunction with the accompanying drawing, in which:

Figure 1 is a representation of a motor embodying the features of the invention shown in relation with a furnace; and Figure 2 is an enlarged cross-sectional view of the motor.

With reference to the drawing, the furnace or oven or other heated compartment, to which the invention may be applied, is represented by the reference character 10 and may comprise generally a base 11 suitably supported by an arrangement of beams 12, a foundation of fire and insulating brick 13, a hollow dome cover 14 having its lower peripheral edge imbedded in a sand seal 15, and a supporting housing 16 having ducts through which the heated gases, inert or otherwise, within the furnace may be circulated. The material to be treated in the furnace is arranged to rest upon the portion indicated by the reference character 17. As the heated gases are circulated within the furnace, it is caused to come in intimate contact with the material which is being treated. In accordance with usual practice, the gases within the cover 14 may be heated to a temperature in the neighborhood of 1400 degrees Fahrenheit or higher.

In this invention, provision is made for circulating the heated gases within the furnace by means of a suitable fan 21 electrically driven by an electric motor 22 having a shaft 23 that extends from the motor through the brick 13 to the fan.

As illustrated in the drawing, the extension shaft 23 is provided with a hollow section 24 in order to provide a reduced cross-sectional area to minimize the amount of heat which flows from the fan 21 through the motor. To further restrict the heat conduction through the extension shaft 23, the end of the shaft beginning at the reference character 25 is constructed of high heat resistance material. The high heat resistance material shaft is indicated by the reference character 26 and may be joined to the regular shaft of a motor at the reference character 25 such, for example, as by welding. Prior to the time that the high heat resistance shaft 26 is welded to the ordinary shaft of the motor, each end of the two shafts are drilled so that when the two shafts are joined together by welding there appears the hollow shell section 24 in order to minimize the flow of heat from the furnace compartment to the motor.

The motor extension shaft extends through a tubular member 27 which is mounted within the brick or wall 13. The tubular member 27 provides communication between the furnace and the inside of the motor housing which is indicated generally by the reference character 29. As illustrated in the drawing, the base member 11 is provided with an external annular surface 28 which constitutes a shoulder against which an annular engagement surface 31 of the motor housing engages for making a tight joint. The annular engagement surface 31 constitutes a part of the upper end portion 30 of the motor housing. The engagement of the annular engagement surface 31 against the annular extension surface 28 of the base of the furnace wall provides for connecting the inside of the furnace to the inside of the motor housing. As illustrated, the motor housing 29 may be connected to the base 11 by any suitable means such, for example, as by the illustrated bolts 32.

The upper end portion 30 of the motor housing is provided with an opening through which the shaft extends and in this opening there is provided an upper bearing illustrated by the reference character 37. The shaft opening in the upper end portion 30 of the motor housing is illustrated by the reference character 33. A motor bearing for the lower end portion of the shaft is indicated by the reference character 38. The motor bearings, particularly the upper bearing, are provided with a large amount of clearance so that as the motor temperature of the shaft and bearing become heated from the heat conducted from the furnace, the expansion of the bearings take up the clearance after which the motor runs with a minimum clearance operation in the bearings. However, in order to reduce the effect of the large clearance in the bearing prior to the time that the motor, shaft and bearings are heated up, there is provided a spring loaded feature in the lower bearing 38. The spring loaded feature comprises the employment of a spring washer for biasing the outside race of the bearing longitudinally relative to the inner race whereby the bearing elements contact the inner and outer races without the effect of a clearance.

The downward thrust of the spring washer in the bearing 38 has the effect of shifting the inner race of the upper bearing with reference to its outer race, whereas the bearing elements in the upper bearing also have the effect of making bearing contact with the outer and inner races the same as though the bearings did not have the extra clearance which is provided to compensate for the expansion of the bearing material after the bearings are once heated up from operation of the fan within the furnace compartment.

As illustrated, the lower end of the motor shaft extends through the motor housing and is arranged to drive an externally mounted fan 42 for supplying air to cool the motor and a lubricant which is provided in a reservoir 41 in the lower part of the motor housing. The lower end of the motor shaft where it extends through the motor housing is provided with a shaft seal 40 which blanks communication from the inside of the motor housing to atmosphere. Thus, the inside of the motor housing which is blanked to atmosphere is connected in communication with the inside of the furnace compartment and thus the pressure in the furnace compartment and in the motor housing is the same. Mounted in the bottom of the lubricant reservoir 41 is a lubricant pump impeller 43 which rotates within an impeller housing 44 for delivering a lubricant from the reservoir 41 through an outlet duct 45 to the upper bearing 37. The lower bearing 38 is lubricated by fumes and vapor emanating from the fluid in the reservoir 41. The lubricant in flowing through the upper bearing is returned to the reservoir through a return duct 47. Mounted upon the motor shaft below the upper bearing 37 is a lubricant slinger member 46 which spins to keep the oil from going down along the motor shaft into the motor housing proper. A drain 48 is provided for draining lubricant from the reservoir 41.

Upon starting the motor, air in the motor compartment is drawn out of the motor compartment by the operation of the fan 21 in the furnace compartment. It is to be observed that the upper bearing 37 is in the path of the communication from the inside of the motor housing to the furnace compartment, and thus as air is drawn through the upper bearing at the same time it is lubricated, there is a tendency for the air flowing through the bearing to disturb the lubricant and cause it to be sprayed upwardly along the shaft. In order to prevent the upwardly moving air through the upper bearing 37 from interfering with the lubricant that is flowing through the upper bearing, there is provided a by-pass 52 which conducts air communication around the upper bearing. The air by-pass conduit 52 has less communication restriction or resistance than that of the upper bearing to minimize air communication through the upper bearing, and thus free the lubricant passing through the upper bearing from being disturbed by the air communication which would normally pass through the upper bearing. The upper end of the by-pass conduit is provided with an upwardly extending nipple 51 having openings in the upper end thereof so that the accumulation of any dust which falls down the tubular member 27 from the furnace does not enter the by-pass conduit 52. Also, the motor shaft at the place where it enters the shaft opening 33 in the upper end of the motor housing, is provided with a dust or particle slinger 20 so as to keep the dirt and other foreign material from entering into the motor housing and to the upper bearing.

As illustrated, there is provided a shell 53 around the motor housing in order to conduct the flow of air from the fan 42 upwardly against the fluid reservoir 41 and along the side of the motor for keeping the fluid reservoir and the motor cool. The upper end of the shell is provided with a top opening 54 whereby the air driven by the fan 42 is expelled to atmosphere. The advantages of the construction of the motor enables the motor to be directly connected to the fan in the heated furnace without damaging the upper bearing and without permitting atmosphere to enter the heated compartment of the furnace, since the shaft seal 40 is air-tight and blanks communication from the inside of the motor housing to atmosphere, and since the inside of the motor housing is sealingly connected to the tubular member 27 at the annular engageable surfaces 28 and 31.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A bearing housing for a shaft for driving a device within a compartment adapted to have a differential fluid pressure between said compartment and said housing, said compartment having a wall provided with a hole extending therethrough and an annular external surface surrounding the hole, said shaft adapted to extend through said hole for driving said device within said compartment, said housing including first and second end portions with said first end portion provided with a shaft opening through which said shaft extends, a bearing for said shaft in said shaft opening, said end portion having an annular engagement surface surrounding said shaft opening, means for securing said annular engagement surface of said end portion to said annular external surface on said wall and thereby connecting said bearing housing in communication with said compartment through said bearing, said second end portion of said bearing housing being sealed to blank communication between atmosphere and said compartment, a liquid reservoir carried below said bearing housing, means for circulating a liquid from said reservoir through said bearing, fluid by-pass means having two ends and interconnecting said first and second end portions of said bearing housing and providing fluid communication around said bearing, both ends of said fluid by-pass means lying above the level of the liquid in said liquid reservoir to thus prevent passage of liquid through said by-pass means, said by-pass means having less communication resistance than that of said bearing, the differential fluid pressure causing a slight fluid flow between said housing and said compartment through said by-pass means rather than through said bearing so as not to disturb said circulating liquid.

2. A bearing housing for a shaft for driving a device within a compartment adapted to have a differential fluid pressure between said compartment and said housing, said compartment having a wall provided with a hole extending therethrough and an annular external surface surrounding the hole, said shaft adapted to extend through said hole for driving said device within said compartment, said housing including first and second end portions with said first end portion provided with a shaft opening through which said shaft extends, a bearing for said shaft in said shaft opening, said end portion having an annular engagement surface surrounding said shaft opening, means for securing said annular engagement surface of said end portion to said annular external surface on said wall and thereby connecting said bearing housing in communication with said compartment through said bearing, said second end portion of said bearing housing being sealed to blank communication between atmosphere and said compartment, a lubricant reservoir carried below said bearing housing, means for circulating a lubricant from said reservoir through said bearing, air by-pass means having two ends and interconnecting said first and second end portions of said bearing housing and providing air communication around said bearing, both ends of said air by-pass means lying above the level of the lubricant in said lubricant reservoir to thus prevent passage of lubricant through said by-pass means, said air by-pass means having less communication resistance than that of said bearing to minimize air communication through said bearing caused by said differential fluid pressure and thereby free the lubricant passing through said bearing from being disturbed by said air communication.

3. A housing for an electric motor for driving a fan within a fan compartment with a differential gas pressure between said compartment and said housing, said compartment having a wall provided with a hole extending therethrough and an annular external surface surrounding the hole, said motor housing having a shaft adapted to extend through said hole for driving said fan within said compartment, said motor housing including an end portion provided with a shaft opening through which said shaft extends, a first bearing compartment for said shaft in said shaft opening, said end portion having an annular engagement surface surrounding said shaft opening, means for securing said annular engagement surface of said motor housing to said annular external surface on said wall and thereby connecting said motor housing in communication with said fan compartment through said first bearing compartment, a first high resistance fluid seal between said fan compartment and said bearing compartment and a second high resistance fluid seal between said bearing compartment and said motor housing, said motor housing being sealed to blank communication between atmosphere and said fan compartment, a lubricant reservoir in said housing, means for circulating a lubricant from said reservoir through said bearing compartment and back again to said reservoir, a second bearing for said shaft having at least a side exposed to lubricant in said reservoir, means for cooling said lubricant, and air by-pass means interconnecting said motor housing and said fan compartment and providing air communication around said first bearing compartment, said air by-pass means having less communication resistance than that of said first bearing compartment to minimize air communication through said first bearing compartment caused by said differential gas pressure and thereby free the lubricant passing through said first bearing compartment from being disturbed by said air communication.

4. A housing for an electric motor for driving a fan within a heated compartment with a differential gas pressure between said compartment and said housing, said compartment having a wall provided with a hole extending therethrough and an annular external surface surrounding the hole, said motor housing having a shaft of a first cross-sectional area smaller than said hole and adapted to extend through said hole for driving said fan within said compartment, said motor housing including an end portion provided with a shaft opening through which said shaft extends, a bearing compartment for said shaft in said shaft opening, said end portion having an annular engagement surface surrounding said shaft opening, means for securing said annular engagement surface of said motor housing to said annular external surface on said wall and thereby connecting said motor housing in communication with said heated compartment through said bearing compartment, a first high resistance fluid seal between said heated compartment and said bearing compartment and a second high resistance fluid seal between said bearing compartment and said motor housing, bypass means interconnecting said motor housing and said heated compartment and providing gas communication around said bearing compartment of lower fluid resistance than said bearing compartment, said motor housing being sealed to blank communication between atmosphere and said housing, means for circulating a lubricant through said bearing compartment, and means to cool said lubricant, said shaft between said fan and said bearing compartment comprising high heat resistance material relative to said motor housing and having a reduced cross-sectional area relative to said first cross-sectional area to reduce heat flow from said fan to said bearing compartment, the differential gas pressure causing a slight gas flow between said motor housing and said heated compartment with said gas flow being principally through said by-pass means rather than through said bearing compartment so as not to disturb the circulation of lubricant through said bearing compartment.

5. A housing for an electric motor for driving a fan within a heated compartment with a differential gas pressure between said compartment and said housing, said compartment having a wall provided with a hole extending therethrough and an annular external surface surrounding the hole, said motor housing having a shaft of a first cross-sectional area smaller than said hole and adapted to extend through said hole for driving said fan within said compartment, said shaft and the hole in said wall establishing an annular passage to said heated compartment said motor housing including an end portion provided with a shaft opening through which said shaft extends, a bearing compartment for said shaft in said shaft opening, said end portion having an annular engagement surface surrounding said shaft opening, means for securing said annular engagement surface of said motor housing to said annular external surface on said wall and thereby connecting said motor housing in communication with said compartment through said bearing compartment, a first high resistance fluid seal between said heated compartment and said bearing compartment and a second high resistance fluid seal between said bearing compartment and said motor housing, said motor housing being sealed to blank communication between atmosphere and said housing, means for circulating a lubricant through said bearing compartment, means to cool said lubricant, said shaft between said fan and said bearing compartment comprising high heat resistance material relative to said motor housing and having a hollow portion to establish a reduced cross-sectional area relative to said first cross-sectional area to reduce heat flow from said fan to said bearing compartment, and air by-pass means interconnecting said motor housing and said annular passage and providing air communication around said bearing compartment, said air by-pass means having less communication resistance than that of said bearing compartment to minimize air communication through said bearing compartment caused by said gas pressure and thereby free the lubricant passing through said bearing compartment from being disturbed by said air communication.

6. A bearing housing for a shaft for driving a device within a compartment adapted to have a differential fluid pressure between said compartment and said housing, said compartment having a wall provided with a hole extending therethrough and an annular external surface surrounding the hole, said shaft adapted to extend through said hole for driving said device within said compartment, said housing including first and second end portions with said first end portion provided with a shaft opening through which said shaft extends, a bearing for said shaft in said shaft opening and including a high resistance fluid seal, said first end portion having an annular engagement surface surrounding said shaft opening, means for securing said annular engagement surface of said first end portion to said annular external surface on said wall and thereby connecting said bearing housing in communication with said compartment through said bearing, said second end portion of said bearing housing being sealed to blank communication between atmosphere and said compartment, a liquid reservoir carried below said bearing housing, means for circulating a liquid from said reservoir through said bearing, fluid by-pass means having two ends and interconnecting said first and second end portions of said bearing housing and providing fluid communication around said bearing, both ends of said fluid by-pass means lying above the level of the liquid in said liquid reservoir to thus prevent passage of liquid through said by-pass means, said by-pass means having less communication resistance than that of said high resistance fluid seal of said bearing, the differential fluid pressure causing a slight fluid flow between said housing and said compartment through said by-pass means rather than through said bearing so as not to disturb said circulating liquid.

7. A bearing housing for a shaft for driving a device within a compartment adapted to have a differential fluid pressure between said compartment and said housing, said compartment having a wall provided with a hole extending therethrough and an annular external surface surrounding the hole, said shaft adapted to extend through said hole for driving said device within said compartment, said housing including first and second end portions with said first end portion provided with a shaft opening through which said shaft extends, a bearing for said shaft in said shaft opening and including a high resistance fluid seal, said first end portion having an annular engagement surface surrounding said shaft opening, means for securing said annular engagement surface of said first end portion to said annular external surface on said wall and thereby connecting said bearing housing in communication with said compartment through said bearing, said second end portion of said bearing housing being sealed to blank communication between atmosphere and said compartment, a lubricant reservoir carried below said bearing housing, means for circulating a lubricant from said reservoir through said bearing, air by-pass means having two ends and interconnecting said first and second end portions of said bearing housing and providing air communication around said bearing, both ends of said air by-pass means lying above the level of the lubricant in said lubricant reservoir to thus prevent passage of lubricant through said by-pass means, said air by-pass means having less communication resistance than that of the high resistance fluid seal of said bearing to minimize air communication through said bearing caused by said differential fluid pressure and thereby free the lubricant passing through said bearing from being disturbed by said air communication.

CHARLES R. SUTHERLAND.

References Cited in the file of this patent

UNITED STATES PATENTS

| Number | Name | Date |
|---|---|---|
| 1,736,002 | Frickey et al. | Nov. 19, 1929 |
| 1,876,767 | Selden | Sept. 13, 1932 |
| 2,000,874 | Babb | May 7, 1935 |
| 2,169,331 | Wechsberg et al. | Aug. 15, 1939 |
| 2,252,673 | Munford | Aug. 12, 1941 |
| 2,301,063 | McConaghy | Nov. 3, 1942 |
| 2,400,711 | Ponomareff et al. | May 21, 1946 |
| 2,422,968 | Jason | June 24, 1947 |